(12) United States Patent
Wu et al.

(10) Patent No.: US 12,543,926 B2
(45) Date of Patent: Feb. 10, 2026

(54) ENDOSCOPE SYSTEM AND WIRELESS CONTROLLER THEREOF

(71) Applicant: INSIGHT MEDICAL SOLUTIONS INC., Hsinchu (TW)

(72) Inventors: Sing Wu, Hsinchu (TW); Chih-Yu Lu, Hsinchu (TW)

(73) Assignee: INSIGHT MEDICAL SOLUTIONS INC., Hsinchu (TW)

( * ) Notice: Subject to any disclaimer, the term of this patent is extended or adjusted under 35 U.S.C. 154(b) by 409 days.

(21) Appl. No.: 18/141,240

(22) Filed: Apr. 28, 2023

(65) Prior Publication Data

US 2023/0414068 A1 Dec. 28, 2023

(30) Foreign Application Priority Data

Jun. 24, 2022 (TW) .................................. 111123590

(51) Int. Cl.
*A61B 1/00* (2006.01)
*A61B 1/04* (2006.01)

(52) U.S. Cl.
CPC ...... *A61B 1/00042* (2022.02); *A61B 1/00124* (2013.01); *A61B 1/00158* (2013.01); *A61B 1/041* (2013.01)

(58) Field of Classification Search
CPC ............ A61B 1/00042; A61B 1/00124; A61B 1/00158; A61B 1/041
See application file for complete search history.

(56) References Cited

U.S. PATENT DOCUMENTS

| | | | | |
|---|---|---|---|---|
| 2009/0082627 | A1* | 3/2009 | Karasawa | A61B 1/3132 600/118 |
| 2009/0198099 | A1* | 8/2009 | Myers | A61B 1/041 600/109 |
| 2010/0105984 | A1* | 4/2010 | Brewer | A61M 25/0127 600/118 |
| 2012/0165792 | A1* | 6/2012 | Ortiz | A61B 1/00148 604/890.1 |
| 2018/0084975 | A1* | 3/2018 | Duan | A61B 1/00158 |

* cited by examiner

*Primary Examiner* — Aaron B Fairchild
(74) *Attorney, Agent, or Firm* — Li & Cai Intellectual Property (USA) Office (57) ABSTRACT

An endoscope system and a wireless controller are provided. The wireless controller includes a handle and a permanent magnet having a non-columnar shape. The handle has a grip portion and a controlling portion that is connected to the grip portion. The permanent magnet is assembled in the controlling portion. The permanent magnet is mirror-symmetrical across a largest area cross-section thereof. Cross-sections parallel to the largest area cross-section gradually decrease in cross sectional area from the largest area cross-section along two opposite directions perpendicular to the largest area cross-section. The permanent magnet of the wireless controller can generate a magnetic field to control a capsule endoscope located in a biological body from outside of the biological body.

10 Claims, 10 Drawing Sheets

ID OSCOPE SYSTEM AND WIRELESS
CONTROLLER THEREOF

CROSS-REFERENCE TO RELATED PATENT APPLICATION

This application claims the benefit of priority to Taiwan Patent Application No. 111123590, filed on Jun. 24, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a controller, and more particularly to an endoscope system and a wireless controller thereof.

BACKGROUND OF THE DISCLOSURE

A conventional endoscope system includes a controller and a capsule endoscope that can be controlled to move by a magnetic force generated from the controller. Since the magnetic force is used to control the capsule endoscope located in a biological body, the controller must be equipped with a large columnar magnet for generating enough magnetic force. Accordingly, the controller in the conventional endoscope system has a weight that is too heavy.

SUMMARY OF THE DISCLOSURE

In response to the above-referenced technical inadequacies, the present disclosure provides an endoscope system and a wireless controller thereof to effectively improve on the issues associated with conventional endoscope systems.

In order to solve the above-mentioned problems, one of the technical aspects adopted by the present disclosure is to provide an endoscope system, which includes a capsule endoscope, a signal processing device, and a wireless controller. The capsule endoscope is provided for being placed into and movable in a biological body. The signal processing device is electrically coupled to the capsule endoscope. The wireless controller is not in contact with the capsule endoscope and includes a handle and a permanent magnet. The handle has a grip portion and a controlling portion that is connected to the grip portion. The permanent magnet has a non-columnar shape and is assembled in the controlling portion. The permanent magnet is mirror symmetrical across a largest area cross-section thereof, and cross-sections parallel to the largest area cross-section gradually decrease in cross sectional area from the largest area cross-section along two opposite directions perpendicular to the largest area cross-section. The permanent magnet of the wireless controller is configured to generate a magnetic field to control the capsule endoscope located in the biological body from outside of the biological body.

In order to solve the above-mentioned problems, another one of the technical aspects adopted by the present disclosure is to provide a wireless controller of an endoscope system, which includes a handle and a permanent magnet. The handle has a grip portion and a controlling portion that is connected to the grip portion. The permanent magnet has a non-columnar shape and is assembled in the controlling portion. The permanent magnet is mirror symmetrical across a largest area cross-section thereof, and cross-sections parallel to the largest area cross-section gradually decrease in cross sectional area from the largest area cross-section along two opposite directions perpendicular to the largest area cross-section. The permanent magnet of the wireless controller is configured to generate a magnetic field to control a capsule endoscope located in a biological body from outside of the biological body.

Therefore, the magnetic field of any one of the wireless controller and the endoscope system provided by the present disclosure is generated from the permanent magnet meeting specific structural conditions (e.g., the permanent magnet having a non-columnar shape, and the cross-sections parallel to the largest area cross-section gradually decrease in cross sectional area from the largest area cross-section along two opposite directions perpendicular to the largest area cross-section) for controlling the capsule endoscope located in the biological body from outside of the biological body, such that the permanent magnet can be formed with a smaller volume and be as light-weight as possible.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 1:
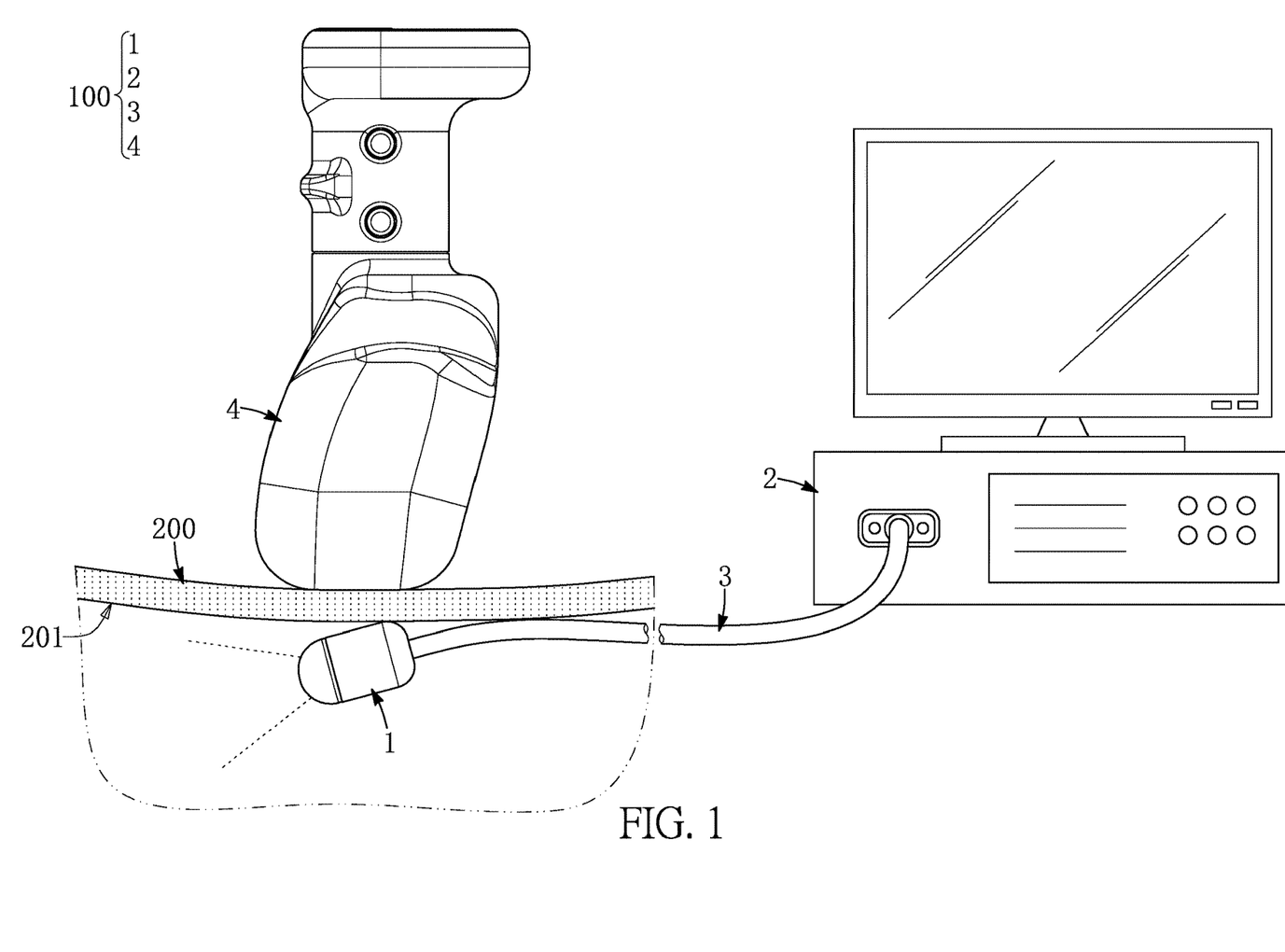
FIG. 1 is a schematic view of an endoscope system according to an embodiment of the present disclosure.
Figure 2:
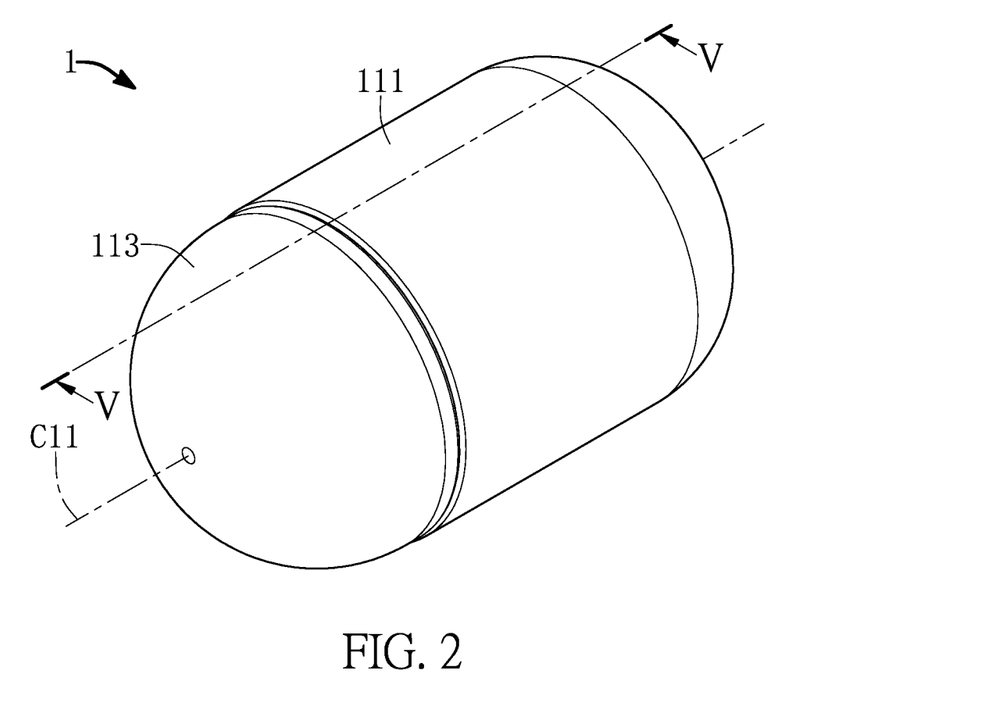
FIG. 2 is a schematic perspective view of a capsule endoscope according to the embodiment of the present disclosure.

Referring to FIG. 1 to FIG. 10, an embodiment of the present disclosure is provided. As shown in FIG. 1, the present embodiment provides an endoscope system 100, which includes a capsule endoscope 1, a signal processing device 2 electrically coupled to the capsule endoscope 1, a cable connector 3 connecting the capsule endoscope 1 and the signal processing device 2, and a wireless controller 4 that is provided for controlling the movement and orientation of the capsule endoscope 1. In other words, a component that is not applied to an endoscope system should not be comparable to any component of the endoscope system 100 provided by the present embodiment.

It should be noted that the endoscope system 100 in the present embodiment includes the above components, but the present disclosure is not limited thereto. For example, in other embodiments of the present disclosure not shown in the drawings, the cable connector 3 can be omitted, and the capsule endoscope 1 is electrically coupled to the signal processing device 2 in a wireless communication manner; or, the capsule endoscope 1 can be independently used (e.g., sold) or can be used in cooperation with other components; or, the wireless controller 4 can be independently used (e.g., sold) or can be used in cooperation with other components.

As shown in FIG. 1 to FIG. 5, the capsule endoscope 1 is provided for being placed into and movable in a biological body 200 (e.g., a human body). The capsule endoscope 1 in the present embodiment includes a capsule shell 11, a magnetic attraction member 12, a camera module 13, and a light emitting diode (LED) module 14. The magnetic attraction member 12, the camera module 13, and the LED module 14 are arranged inside of the capsule shell 11, but the present disclosure is not limited thereto. For example, in other embodiments of the present disclosure not shown in the drawings, the capsule endoscope 1 can further include at least one electronic component arranged inside of the capsule shell 11.

It should be noted that in order to enable the capsule endoscope 1 to be smoothly operated (e.g., image capturing of the camera module 13 and lighting of the LED module 14 do not interfere with each other), the components of the capsule endoscope 1 are preferably arranged to meet the following structural conditions, but the present disclosure is not limited thereto.

Figure 3:
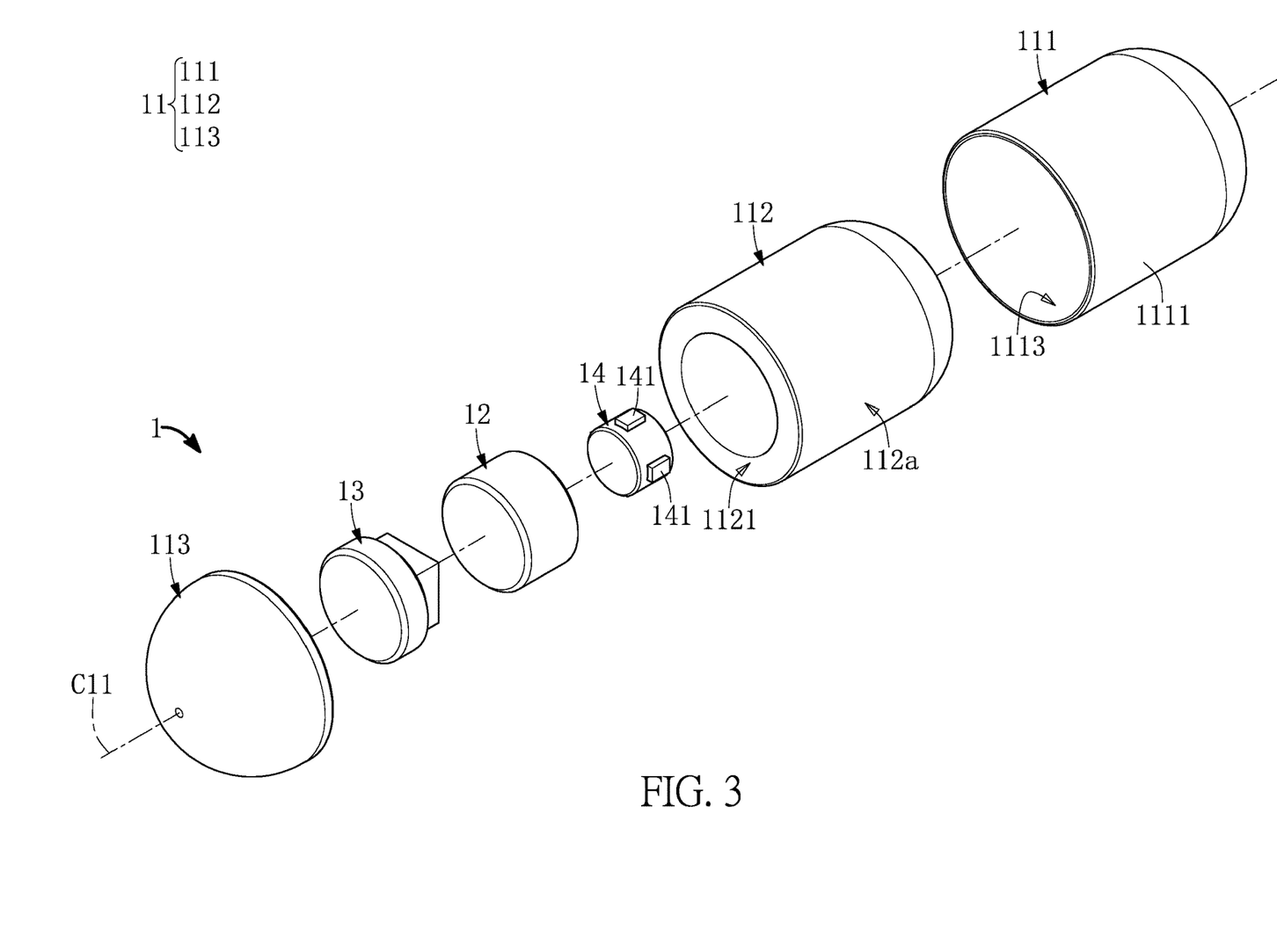
FIG. 3 is a schematic exploded view of FIG. 2.
Figure 4:
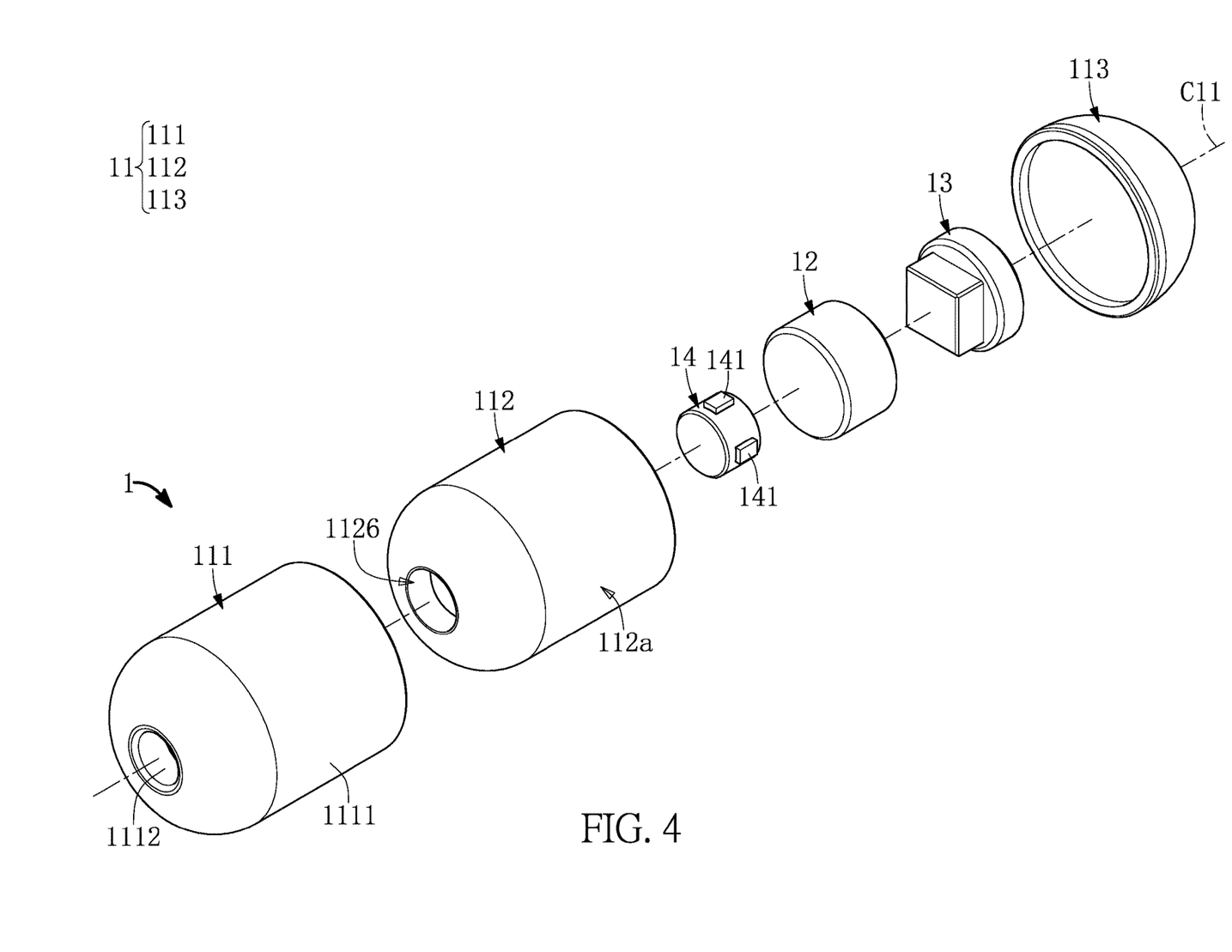
FIG. 4 is a schematic exploded view of FIG. 2 from another angle of view.
Figure 5:
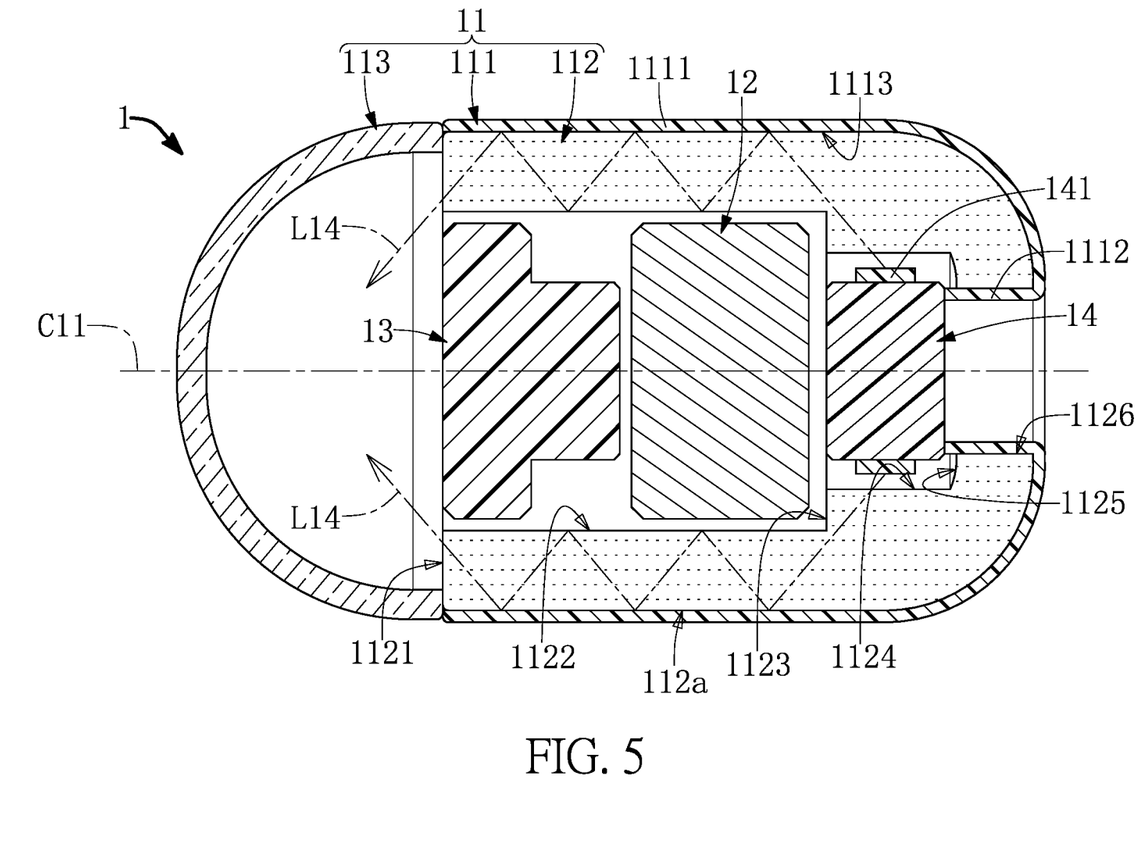
FIG. 5 is a schematic cross-sectional view taken along line V-V of FIG. 2.

The capsule shell 11 defines a central line C11, and the capsule shell 11 is preferably symmetrical to the central line C11, but the present disclosure is not limited thereto. Specifically, the capsule shell 11 in the present embodiment includes a reflective housing 111, a light-guiding structure 112 disposed in the reflective housing 111, and an observation end portion 113 that is disposed on (or connected to) a front end of the reflective housing 111 and a front end of the light-guiding structure 112.

The reflective housing 111 has a covering portion 1111 and a tubular portion 1112 that is connected to a rear end of the covering portion 1111. The covering portion 1111 is substantially in a tubular shape, and an inner diameter of a front end of the covering portion 1111 is greater than an inner diameter of the rear end of the covering portion 1111. Moreover, an inner diameter of the tubular portion 1112 is substantially equal to the inner diameter of the rear end of the covering portion 1111, and the tubular portion 1112 extends from the rear end of the covering portion 1111 into an interior of the covering portion 1111.

The light-guiding structure 112 is substantially in a tubular shape and has a light input surface 1124 and a light output surface 1121 that is opposite to the light input surface 1124. Any one of the light input surface 1124 and the light output surface 1121 is in an annular shape having a center located on the central line C11, and a normal vector of the light input surface 1124 is non-parallel to a normal vector of the light output surface 1121. In the present embodiment, the normal vector of the light input surface 1124 is perpendicular to the normal vector of the light output surface 1121, and the normal vector of the light input surface 1124 is parallel to the central line C11.

Specifically, an outer surface 112a of the light-guiding structure 112 corresponds in shape to an inner surface 1113 of the reflective housing 111 (or the covering portion 1111), and the inner surface 1113 is a reflective surface. The light-guiding structure 112 is inserted into the reflective housing 111, and the outer surface 112a of the light-guiding structure 112 is arranged adjacent to or abuts against the inner surface 1113 of the reflective housing 111.

Moreover, an inner side of the light-guiding structure 112 in the present embodiment is substantially in a stepped shape and preferably has a total reflection property. The inner side of the light-guiding structure 112 has a first tread surface 1121 (i.e., the light output surface 1121), a first riser surface 1122, a second tread surface 1123, a second riser surface 1124 (e.g., the light input surface 1124), a third tread surface 1125, and a third riser surface 1126. The first tread surface 1121, the first riser surface 1122, the second tread surface 1123, the second riser surface 1124, the third tread surface 1125, and the third riser surface 1126 are sequentially arranged from a front end to a rear end of the light-guiding structure 112 and each have an annular shape having a center located on the central line C11. The first tread surface 1121 is substantially flush with (or coplanar with) the front end of the reflective housing 111, and the third riser surface 1126 is arranged adjacent to or abuts against the tubular portion 1112 of the reflective housing 111.

The observation end portion 113 in the present embodiment is substantially a hemispherical transparent cover, and corresponds in position to the light output surface 1121 (and the front end of the reflective housing 111). For example, an edge of the observation end portion 113 can be disposed on (or connected to) a connection interface of the light output surface 1121 and the front end of the reflective housing 111.

It should be noted that the light-guiding structure 112 and the observation end portion 113 of the capsule shell 11 in the present embodiment are cooperated with the reflective housing 111, but the present disclosure is not limited thereto. For example, in other embodiments of the present disclosure not shown in the drawings, the capsule shell 11 can be provided without the reflective housing 111, and the outer surface 112a of the light-guiding structure 112 is a total reflection surface; or, the reflective housing 111 can be replaced by other structures (e.g., a reflective coating layer formed on the outer surface 112a of the light-guiding structure 112).

The magnetic attraction member 12, the camera module 13, and the LED module 14 are arranged inside of the light-guiding structure 112 and are located on the central line C11. The magnetic attraction member 12 in the present embodiment is a magnet, and the camera module 13 and the LED module 14 are arranged at two opposite sides of the magnetic attraction member 12. Specifically, the magnetic attraction member 12 and the camera module 13 are arranged inside of the first riser surface 1122, the magnetic attraction member 12 is substantially disposed on the second tread surface 1123, and the camera module 13 faces toward the observation end portion 113, thereby enabling the camera module 13 to capture an image from an environment outside of the capsule endoscope 1 (or in front of the observation end portion 113) through the observation end portion 113.

Moreover, the LED module 14 is arranged inside of the second riser surface 1123 (i.e., the light input surface 1124), and can be disposed on a free end of the tubular portion 1112. In other words, the LED module 14 faces toward the light input surface 1124 of the light-guiding structure 112, the LED module 14 is configured to emit light L14 traveling into the light-guiding structure 112 by passing through the light input surface 1124, and the light-guiding structure 112 is configured to enable the light L14 therein to travel onto and pass through the light output surface 1121 for scattering toward the observation end portion 113.

Accordingly, the capsule endoscope 1 provided by the present embodiment includes the light-guiding structure 112 and the LED module 14 cooperated with the light-guiding structure 112, so that the light-guiding structure 112 can provide a path of sufficient length for allowing the light L14 emitted from the LED module 14 to form a scattering light and preventing an operation of the capsule endoscope 1 (e.g., image capturing of the camera module 13) from being affected by spots.

In order to enable the light L14 emitted from the LED module 14 to have a uniform effect on the light output surface 1121, the LED module 14 and the light-guiding structure 112 of the capsule endoscope 1 preferably meet at least one of the following conditions, but the present disclosure is not limited thereto.

The LED module 14 includes a plurality of light emitters 141 spaced apart from each other and being in an annular arrangement. The light emitters 141 are configured to emit light beams L14 traveling into the light-guiding structure 112 by passing through the light input surface 1124, and the light-guiding structure 112 is configured to enable the light beams L14 therein to be mixed and to pass therethrough from the light output surface 1121. Specifically, the light beam L14 emitted from any one of the light emitters 141 travels along a path in the light-guiding structure 112, where the path can be a spiral relative to the central line C11, so that the light beams L14 emitted from the light emitters 141 can be uniformly mixed in the light-guiding structure 112, but the present disclosure is not limited thereto.

For example, a light emitting surface of any one of the light emitter 141 can be non-perpendicular to a normal vector of a part of the light input surface 1124 that faces toward the light emitting surface, so that after the corresponding light beam L14 enters into the light-guiding structure 112, the corresponding light beam L14 can be continuously reflected through the first riser surface 1122 and the inner surface 1113 of the reflective housing 111 and can spirally travel around the central line C11 to the light output surface 1121. Moreover, the light emitters 141 of the LED module 14 can be provided to emit the light beams L14 of a same wavelength or different wavelengths according to design requirements, but the present disclosure is not limited thereto.

In addition, an end of the cable connector 3 is connected (or fixed) to the capsule endoscope 1 and is arranged adjacent to the LED module 14 (e.g., the end of the cable connector 3 is inserted into the tubular portion 1112 and is electrically coupled to the LED module 14 and the camera module 13), and another end of the cable connector 3 is (insertably) connected to the signal processing device 2, so that signals or images obtained from the capsule endoscope 1 can be transmitted to the signal processing device 2 through the cable connector 3, and electricity and command signals for the operation of the capsule endoscope 1 can be obtained from the signal processing device 2 through the cable connector 3, but the present disclosure is not limited thereto.

As shown in FIG. 6 to FIG. 10, the wireless controller 4 is not in contact with the capsule endoscope 1, and the wireless controller 4 is configured to generate a magnetic field to control (the movement and orientation of) the magnetic attraction member 12 of the capsule endoscope 1 located in the biological body 200 from outside of the biological body 200. The wireless controller 4 includes a handle 41 and a permanent magnet 42 that is assembled in the handle 41. In other words, the wireless controller 4 in the present embodiment does not have any electric power. It should be noted that in order to enable the wireless controller 4 to be as light-weight as possible under the condition of being capable of controlling the capsule endoscope 1, the structures and the arrangement of the components of the wireless controller 4 preferably meet the following structural conditions, but the present disclosure is not limited thereto.

Figure 6:
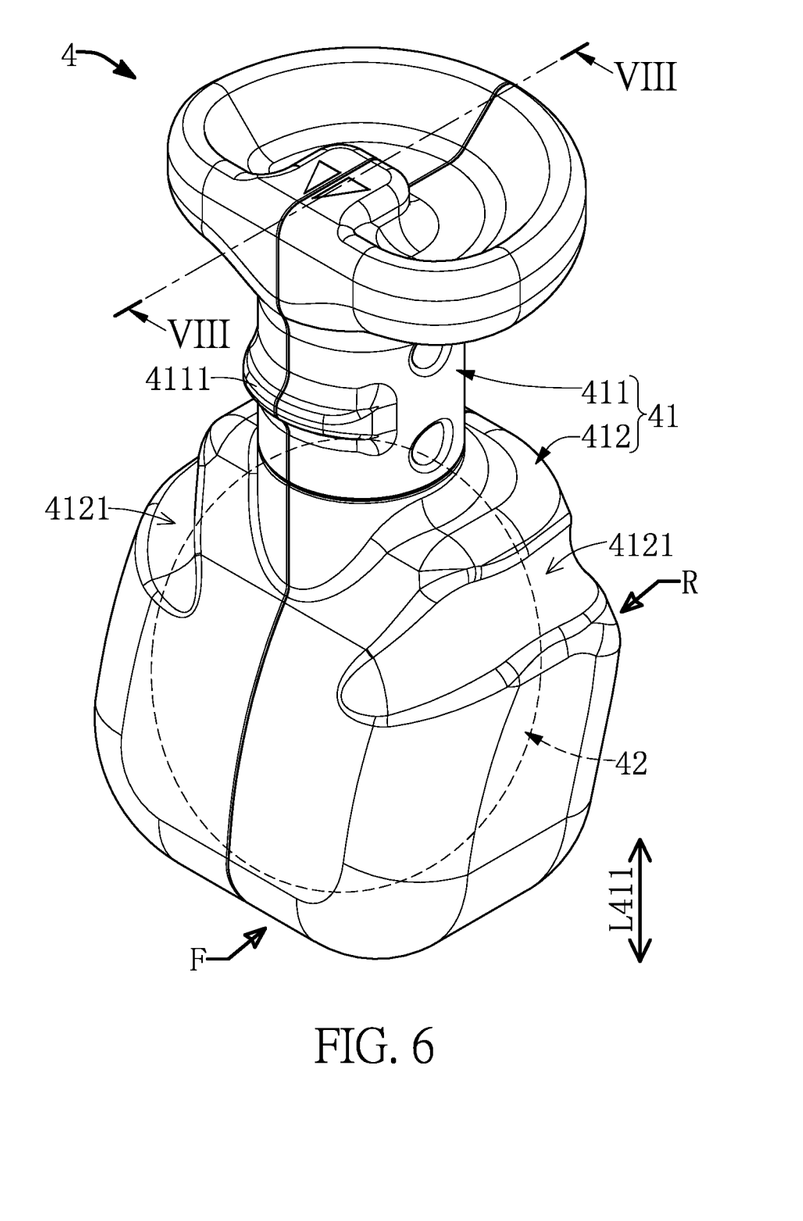
FIG. 6 is a schematic perspective view of a wireless controller according to the embodiment of the present disclosure.
Figure 7:
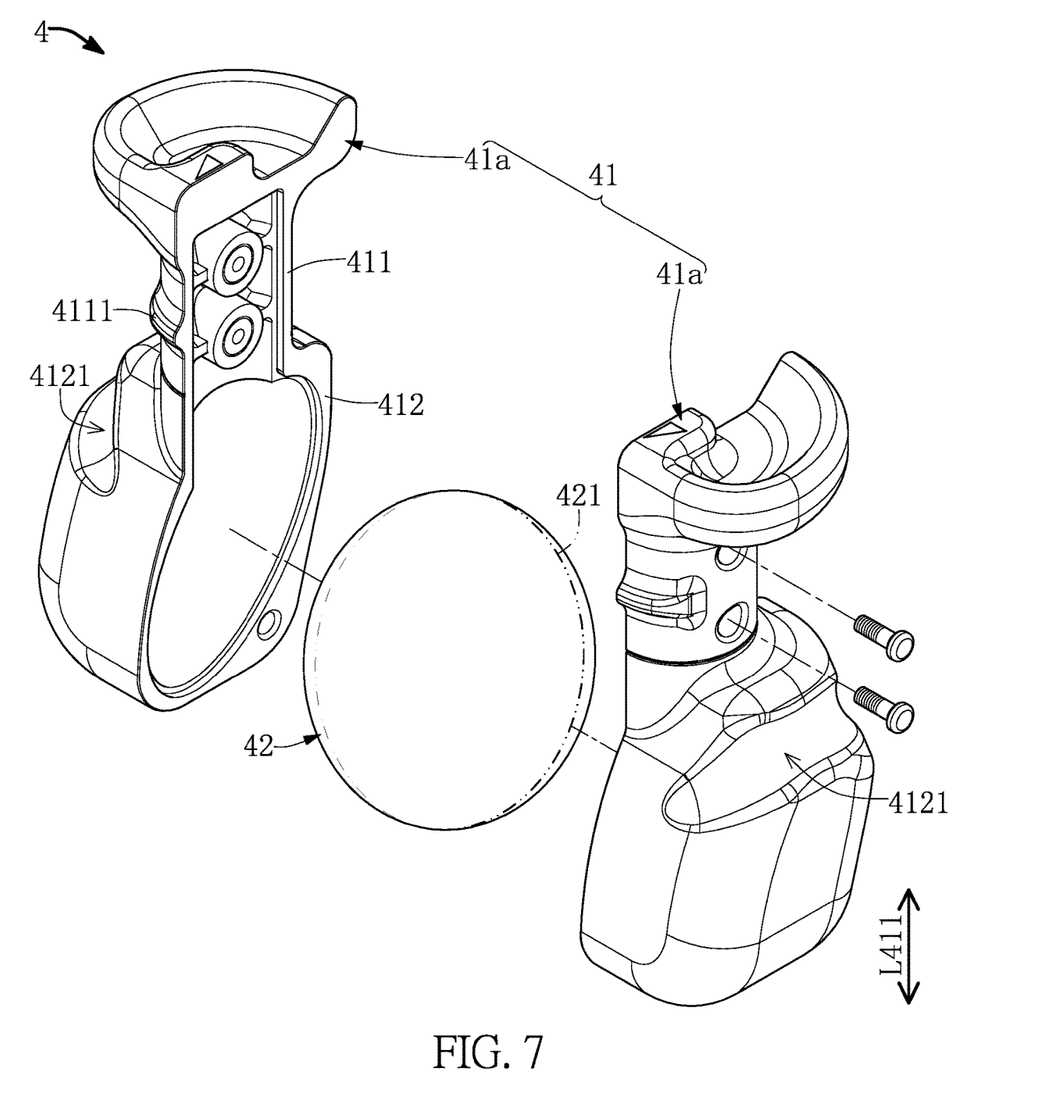
FIG. 7 is a schematic exploded view of FIG. 6.

The handle 41 of the present embodiment includes two half-handles 41a that are in mirror symmetry and that are locked with each other through screws, but the present disclosure is not limited thereto. In the present embodiment, the handle 41 has a grip portion 411 and a controlling portion 412 that is (integrally) connected to the grip portion 411. In order to clearly describe the present embodiment, the handle 41 defines a front side F and a rear side R that is opposite to the front side F, and the grip portion 411 has an elongated shape defining a longitudinal direction L411.

Figure 8:
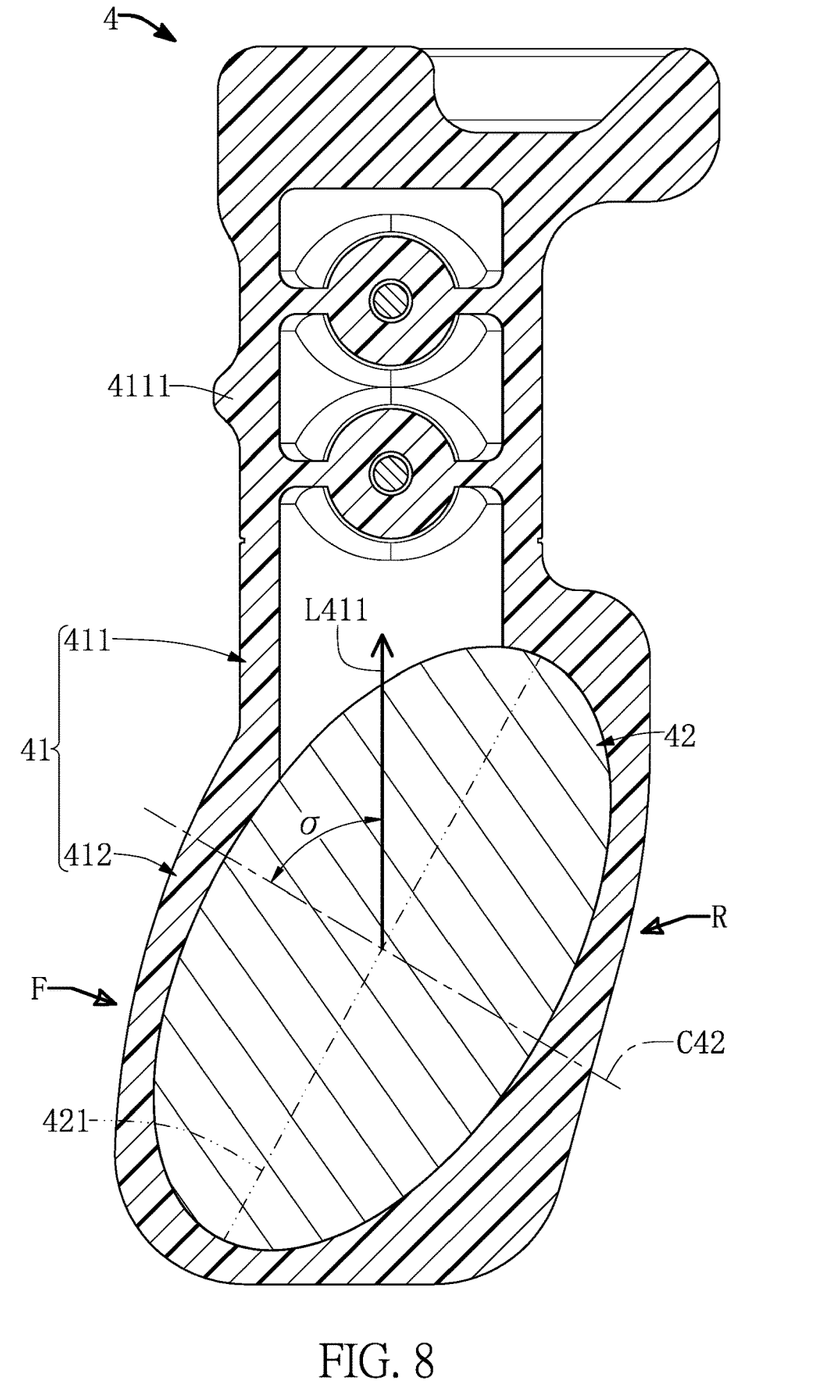
FIG. 8 is a schematic cross-sectional view taken along line VIII-VIII of FIG. 6.

Specifically, the permanent magnet 42 is assembled in the controlling portion 412, and a part of the permanent magnet 42 is located at the front side F and away from the grip portion 411, so that the permanent magnet 42 can be in a slanting arrangement relative to the grip portion 411, but the present disclosure is not limited thereto. Moreover, the grip portion 411 has an orientation rib 4111 located at the front side F and provided for being positioned between two fingers, and the controlling portion 412 has two orientation grooves 4121 recessed in surfaces thereof and arranged on two opposite sides thereof. Each of the two orientation grooves 4121 extends from the front side F to the rear side R, and the orientation grooves 4121 are arranged adjacent to the grip portion 411.

Accordingly, when a hand of a user grips the grip portion 411 and the controlling portion 412 is located under the hand, two fingers of the hand adjacent to each other clamp the orientation rib 4111, a bottom side of the hand is positioned in the two orientation grooves 4121, so that a front side of the user and the front side F defined by the handle 41 can be automatically orientated to a same direction, and the wireless controller 4 can be manipulated intuitively by the user.

Figure 9:
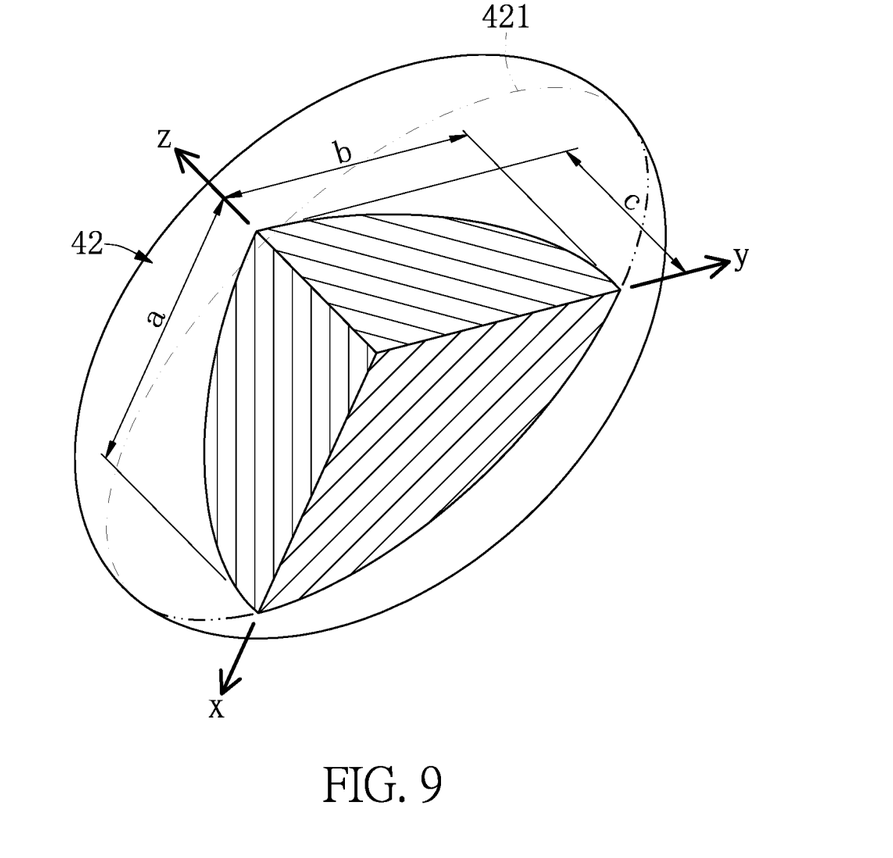
FIG. 9 is a partial schematic cross-sectional view showing a permanent magnet of the wireless controller of FIG. 7.

The permanent magnet 42 has a non-columnar shape and a non-spherical shape. Moreover, an outer surface of the permanent magnet 42 is one enclosed curved surface, the permanent magnet 42 is mirror symmetrical to a largest area cross-section 421 thereof, and cross-sections parallel to the largest area cross-section 421 gradually decrease in cross sectional area from the largest area cross-section 421 along two opposite directions perpendicular to the largest area cross-section 421, but the present disclosure is not limited thereto. For example, in other embodiments of the present disclosure not shown in the drawings, the outer surface of the permanent magnet 42 can include two flat surfaces parallel to each other and a curved side surface that is connected in-between the two flat surfaces and that is substantially in a spherical shape or an ellipsoid shape. In other words, the permanent magnet 42 can have a spherical shape (or an ellipsoid shape) formed with truncated surfaces at two ends thereof.

Figure 10:
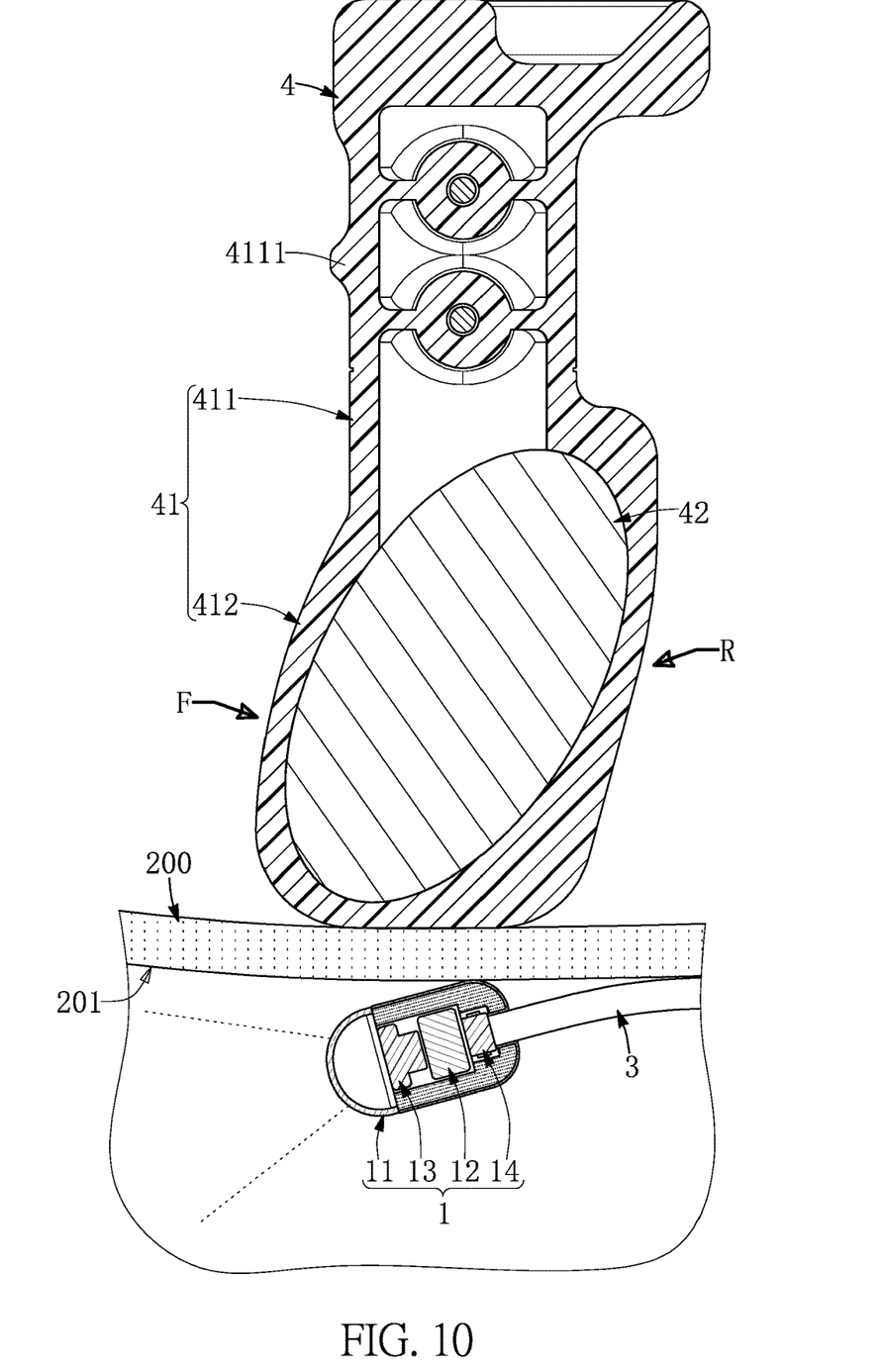
FIG. 10 is a schematic cross-sectional view showing a cooperative operation of the wireless controller and the capsule endoscope.

Accordingly, the magnetic field of the wireless controller 4 in the present embodiment is generated from the permanent magnet 42 meeting the above structural conditions for controlling (the movement and orientation of) the capsule endoscope 1 located in the biological body 200 from outside of the biological body 200, such that the permanent magnet 42 can be formed with a smaller volume and be as light-weight as possible.

Specifically, the permanent magnet 42 in the present embodiment has a spherical shape or an ellipsoid shape and preferably meets the following structural conditions, but the present disclosure is not limited thereto. The permanent magnet 42 in the present embodiment defines a z-axis perpendicular to the largest area cross-section 421, an x-axis perpendicular to the z axis, and a y-axis that is perpendicular to the z axis and the x-axis. Moreover, half-axes of the permanent magnet 42 respectively arranged along the x-axis, the y-axis, and the z-axis are represented by "a", "b", and "c", and the outer surface of the permanent magnet 42 is defined by satisfying the equation: $(x^2/a^2)+(y^2/b^2)+(z^2/c^2)= 1$, where both "a" and "b" are different from "c".

In FIG. 9, "a" is equal to "b", and when the permanent magnet 42 is compared to a columnar magnet (not shown in the drawings) that has a radius of "a", a height of "2c", and a demagnetizing factor being equal to a demagnetizing factor of the permanent magnet 42, the volume of the permanent magnet 42 is 60% to 70% (e.g., 67%) of a volume of the columnar magnet. Accordingly, under the condition that the permanent magnet 42 has enough magnetic force, the volume of the permanent magnet 42 provided by the present embodiment can be decreased and the permanent magnet 42 provided by the present embodiment can be formed to be as light-weight as possible, but the present disclosure is not limited thereto. For example, in other embodiments of the present disclosure not shown in the drawings, "a" can be not equal to "b" for the permanent magnet 42.

In other words, the permanent magnet 42 defines a central axis C42 perpendicular to the largest area cross-section 421, and the central axis C42 of the permanent magnet 42 is non-parallel to the longitudinal direction L411 of the grip portion 411 (e.g., the permanent magnet 42 is in a slanting arrangement relative to the grip portion 411).

Specifically, an inclination angle σ between the central axis C42 and the longitudinal direction L411 is within a range from 1 degree to 80 degrees (e.g., the inclination angle σ is preferably within a range from 50 degrees to 70 degrees). When the wireless controller 4 abuts against the biological body 200 in an upright manner and the capsule endoscope 1 is moved along an inner surface 201 of an organ of the biological body 200, the magnetic field generated from the permanent magnet 42 enables the camera module 13 of the capsule endoscope 1 to face away from the inner surface 201 of the organ through the inclination angle σ, thereby effectively preventing an image capturing area of the camera module 13 from being occupied by the inner surface 201 of the organ. Accordingly, the camera module 13 can be operated with an exemplary capturing performance.

Beneficial Effects of the Embodiment

In conclusion, the capsule endoscope provided by the present disclosure includes the light-guiding structure and the LED module cooperated with the light-guiding structure, so that the light-guiding structure can provide a path of sufficient length for allowing the light emitted from the LED module to form a scattering light and preventing an operation of the capsule endoscope (e.g., image capturing of the camera module) from being affected by spots.

Moreover, the magnetic field of the wireless controller in the present disclosure is generated from the permanent magnet meeting specific structural conditions (e.g., the permanent magnet having a non-columnar shape, the outer surface of the permanent magnet being one enclosed curved surface, and the cross-sections parallel to the largest area cross-section gradually decrease in cross sectional area from the largest area cross-section along two opposite directions perpendicular to the largest area cross-section) for controlling the capsule endoscope located in the biological body from outside of the biological body, such that the permanent magnet can be formed with a smaller volume and be as light-weight as possible.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. An endoscope system, comprising:
   a capsule endoscope provided for being placed into and movable in a biological body;
   a signal processing device electrically coupled to the capsule endoscope; and a wireless controller configured to be operated without physical contact with the capsule endoscope and including:
   a handle having a grip portion and a controlling portion that is connected to the grip portion; and
   a permanent magnet having a non-columnar shape configured to be retained by the controlling portion, wherein the permanent magnet is mirror symmetrical across a largest area cross-section thereof, and cross-sections parallel to the largest area cross-section gradually decrease in cross sectional area from the largest area cross-section along two opposite directions perpendicular to the largest area cross-section;
   wherein the permanent magnet of the wireless controller is configured to generate a magnetic field to control the capsule endoscope located in the biological body from outside of the biological body.

2. The endoscope system according to claim 1, wherein the grip portion has an elongated shape defining a longitudinal direction, and the permanent magnet defines a central axis perpendicular to the largest area cross-section, and wherein the central axis of the permanent magnet is non-parallel to the longitudinal direction of the grip portion.

3. The endoscope system according to claim 2, wherein an inclination angle between the central axis and the longitudinal direction is within a range from 1 degree to 80 degrees, and wherein, when the wireless controller abuts against the biological body in an upright manner and the capsule endoscope is moved along an inner surface of an organ of the biological body, the magnetic field generated from the permanent magnet enables a camera module of the capsule endoscope to face away from the inner surface of the organ through the inclination angle.

4. The endoscope system according to claim 2, wherein the handle defines a front side and a rear side that is opposite to the front side, and wherein the grip portion has an orientation rib located at the front side and provided for being positioned between two fingers, and a part of the permanent magnet is located at the front side and away from the grip portion.

5. The endoscope system according to claim 4, wherein the controlling portion has two orientation grooves recessed in surfaces thereof and arranged on two opposite sides thereof, and wherein each of the two orientation grooves extends from the front side to the rear side, and the orientation grooves are arranged adjacent to the grip portion.

6. The endoscope system according to claim 1, further comprising a cable connector, wherein an end of the cable connector is connected to the capsule endoscope, and another end of the cable connector is connected to the signal processing device.

7. The endoscope system according to claim 1, wherein the permanent magnet defines a z-axis perpendicular to the largest area cross-section, an x-axis perpendicular to the z axis, and a y-axis that is perpendicular to the z axis and the x-axis, wherein half-axes of the permanent magnet respectively arranged along the x-axis, the y-axis, and the z-axis are represented by "a", "b", and "c", and wherein an outer surface of the permanent magnet is one enclosed curved surface that is defined by satisfying an equation: $(x^2/a^2)+(y^2/b^2)+(z^2/c^2)=1$, where both of "a" and "b" are different from "c".

8. The endoscope system according to claim 7, wherein "a" is equal to "b", and wherein, when the permanent magnet is compared to a columnar magnet that has a radius of "a", a height of "2c", and a demagnetizing factor being equal to a demagnetizing factor of the permanent magnet, the volume of the permanent magnet is 60% to 70% of a volume of the columnar magnet.

9. A wireless controller of an endoscope system, comprising:
   a handle having a grip portion and a controlling portion that is connected to the grip portion; and
   a permanent magnet having a non-columnar shape and being assembled in the controlling portion, wherein the permanent magnet is mirror symmetrical across a largest area cross-section thereof, and cross-sections parallel to the largest area cross-section gradually decrease in cross sectional area from the largest area cross-section along two opposite directions perpendicular to the largest area cross-section;
   wherein the permanent magnet of the wireless controller is configured to generate a magnetic field to control a capsule endoscope located in a biological body from outside of the biological body.

10. The wireless controller according to claim 9, wherein the grip portion has an elongated shape defining a longitudinal direction, the permanent magnet defines a central axis perpendicular to the largest area cross-section, and an inclination angle between the central axis and the longitudinal direction is within a range from 1 degree to 80 degrees, wherein the permanent magnet defines a z-axis perpendicular to the largest area cross-section, an x-axis perpendicular to the z axis, and a y-axis that is perpendicular to the z axis and the x-axis, wherein half-axes of the permanent magnet respectively arranged along the x-axis, the y-axis, and the z-axis are represented by "a", "b", and "c", and wherein an outer surface of the permanent magnet is one enclosed curved surface that is defined by satisfying an equation: $(x^2/a^2)+(y^2/b^2)+(z^2/c^2)=1$, where both of "a" and "b" are different from "c".

* * * * *